US008962704B2

(12) United States Patent
Ryntz et al.

(10) Patent No.: US 8,962,704 B2
(45) Date of Patent: *Feb. 24, 2015

(54) CLOSED-LOOP RECYCLED POLYURETHANE FOAM, METHODS OF MANUFACTURE AND PRODUCTS THEREFROM

(71) Applicant: International Automotive Components Group North America, Inc., Southfield, MI (US)

(72) Inventors: Rose Ann Ryntz, Clinton Township, MI (US); Terrence Marsh McRoberts, Holly, MI (US)

(73) Assignee: International Automotive Components Group North America, Inc., Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/092,220

(22) Filed: Nov. 27, 2013

(65) Prior Publication Data

US 2014/0155503 A1   Jun. 5, 2014

Related U.S. Application Data

(63) Continuation of application No. 13/170,709, filed on Jun. 28, 2011, now Pat. No. 8,609,740.

(51) Int. Cl.

| C08J 11/04 | (2006.01) |
| C08J 11/10 | (2006.01) |
| C08J 11/24 | (2006.01) |
| C08G 18/50 | (2006.01) |
| C08G 18/83 | (2006.01) |
| C08G 101/00 | (2006.01) |

(52) U.S. Cl.
CPC ............. *C08J 11/10* (2013.01); *C08J 11/24* (2013.01) *C08G 18/5045* (2013.01); *C08G 18/831* ; (2013.01); *C08J 2300/30* (2013.01); *C08J 2375/04* (2013.01); *C08G 2101/0025* (2013.01); *C08G 2101/0008* (2013.01); *C08G 2101/005* (2013.01); *C08G 2101/0083* (2013.01); *Y10S 521/904* (2013.01)
USPC .............. 521/49.5; 521/49; 521/50; 521/155; 521/904

(58) Field of Classification Search
CPC ............. C08G 18/5045; C08G 18/831; C08G 2101/0025; C08J 11/24; C08J 2300/30; C08J 2375/04
USPC .............. 521/40, 49, 49.5, 50, 137, 155, 170, 521/904, 914
See application file for complete search history.

(56) References Cited

U.S. PATENT DOCUMENTS

| 5,114,985 A | 5/1992 | Kuyzin et al. |
| 5,300,530 A | 4/1994 | Machado et al. |

(Continued)

OTHER PUBLICATIONS

G.S.Kuyzin, et al; SAE Technical Paper No. 900096 untitled "Low-Density SRIM Technology—For Automotive Interior Trim Door Panels"; International Congress & Exposition, Detroit MI, Feb. 26-Mar. 2, 1990; ISSN 0148-7191 (10 pgs).

*Primary Examiner* — Frances Tischler
(74) *Attorney, Agent, or Firm* — Grossman, Tucker, Perreault & Pfleger PLLC

(57) ABSTRACT

The present disclosure relates to the production of molded products containing recycled content, and more particularly polyurethane foam which includes polyol recovered from chemical recycling of polyurethane foam scrap, which polyol has been treated to optimize viscosity and/or reactivity characteristics.

14 Claims, 2 Drawing Sheets

(56) References Cited

U.S. PATENT DOCUMENTS

| | | |
|---|---|---|
| 5,556,889 A | 9/1996 | Naber et al. |
| 5,763,692 A | 6/1998 | Kierkus et al. |
| 6,015,856 A | 1/2000 | Matsushita et al. |
| 6,087,409 A | 7/2000 | Naber et al. |
| 6,750,260 B2 | 6/2004 | Sendijarevic |
| 6,802,997 B2 | 10/2004 | Uekado et al. |
| 2008/0265457 A1* | 10/2008 | McLeod et al. ............... 264/255 |
| 2010/0288582 A1 | 11/2010 | May et al. |

* cited by examiner

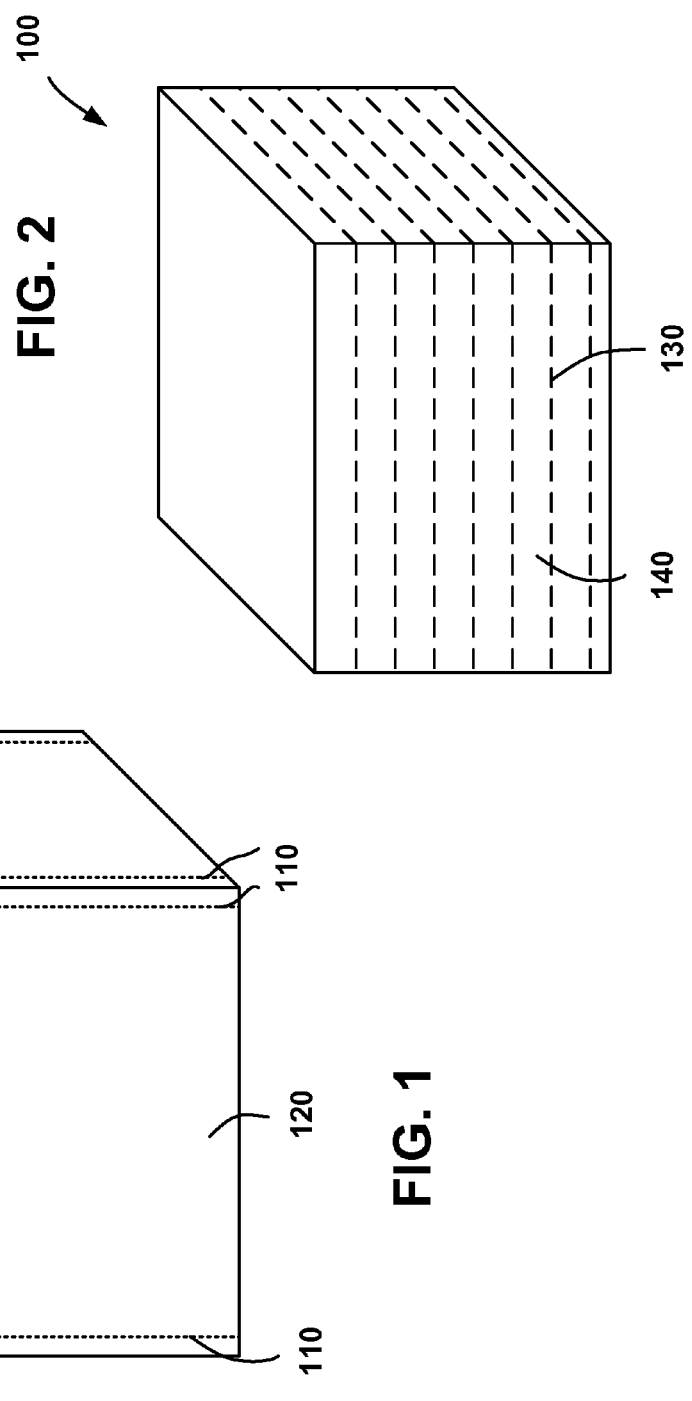

CLOSED-LOOP RECYCLED POLYURETHANE FOAM, METHODS OF MANUFACTURE AND PRODUCTS THEREFROM

CROSS REFERENCE TO RELATED APPLICATIONS

This application is a continuation of U.S. Application Ser. No. 13/170,709, filed Jun. 28, 2011, now U.S. Pat. No. 8,609,740 issued Dec. 17, 2013, the teachings of which are incorporated herein by reference.

FIELD OF THE INVENTION

The present disclosure relates to the production of molded products containing recycled content, and more particularly polyurethane foam which includes polyol recovered from chemical recycling of polyurethane foam scrap, which polyol has been treated to optimize viscosity and/or reactivity characteristics.

BACKGROUND

Polyol and isocyanate may be mixed and reacted with each other to provide polyurethane foam, which may be formed in a large free-rise bun. The free-rise bun of polyurethane foam may then be sliced to provide a plurality of similarly sized skived polyurethane foam sheets. The polyurethane foam sheets may then be used in the manufacture of other products. For example, the polyurethane foam sheets may be used in the manufacture of automotive trim products, such as headliners.

Trim waste may be produced when the bun of polyurethane foam is sliced to ultimately produce various polyurethane foam products. The trim waste may be used in various recycling streams, such as being used as rebond foam or as a filler. To produce rebonded polyurethane foam, the trim waste may be shredded to suitable sizes which are then glued together, typically to provide a rebonded sheet which may be used for carpet underlay. The polyurethane foam may also be pulverized to provide a regrind of suitable particle size to be used as a filler in subsequent plastic processing operations.

While use of the polyurethane foam trim waste in such foregoing manners may better protect the environment as opposed to discarding the trim waste into a landfill, it is desirable to incorporate the trim waste back into the manufacturing process from which it originated and not rely upon alternative recycling streams.

SUMMARY

The present disclosure provides systems, methods and products to utilize trim waste and other scrap polyurethane, particularly rigid polyurethane foam, in the manufacturing process from which it originated, particularly as a reactive precursor component for the production of future polyurethane material.

More particularly, the present disclosure provides systems, methods and products for closed-loop recycling of rigid foam polyol recovered as a byproduct from scrap polyurethane foam by a chemolysis procedure. The recovered polyol may be treated to optimize viscosity and/or reactivity characteristics for production of polyurethane material, such as rigid foam polyurethane. As used herein, closed loop recycling may be understood as recycling a product back into the same or similar product, or recycling materials into their original form.

In particular, the present disclosure stands directed at a method for recycling of glycolysis products from polyurethane foam scrap comprising providing a mixture of 75-95 parts by weight of a polyol that has a viscosity range of 1760 cps at 15° C. to 218 cps at 45° C. in combination with chemolysis polyol products of a polyurethane foam wherein the chemolysis polyol has an average equivalent weight in the range of 100-500 and wherein the glycolysis polyol product has a viscosity range of 40,000 cps at 20° C. to 2000 cps at 50° C. One may then add to such mixture a viscosity reducer comprising a dibasic ester wherein said dibasic ester is present at a level of 1-10 parts by weight.

The present disclosure also stands directed to a method for forming a polyurethane foam for a vehicle headliner comprising providing a mixture of 75-95 parts by weight of a polyol that has a viscosity range of 1760 cps at 15° C. to 218 cps at 45° C. in combination with chemolysis polyol products of a polyurethane foam wherein the chemolysis polyol has an average equivalent weight in the range of 100-500 and wherein the glycolysis polyol product has a viscosity range of 40,000 cps at 20° C. to 2000 cps at 50° C. One may then add to such mixture a viscosity reducer comprising a dibasic ester wherein the dibasic ester is present at a level of 1-10 parts by weight wherein the mixture has a viscosity in the range of 1,100 to 1300 cps at 20° C. This may then be followed by adding a polymerization catalysts to said mixture wherein said mixture including said viscosity reducer is combined with isocyanate compounds to form a foam wherein the catalyst is present at a level of 0.1 to 1.0 part by weight and wherein the foam formation is characterized by a gel time of 220 seconds or longer and/or a rise time of 345 seconds or longer.

FIGURES

The above-mentioned and other features of this disclosure, and the manner of attaining them, will become more apparent and better understood by reference to the following description of embodiments described herein taken in conjunction with the accompanying drawings, wherein:

FIG. 1 illustrates a polyurethane foam bun prior to trimming;

FIG. 2 illustrates the polyurethane foam bun after trimming;

DETAILED DESCRIPTION

Figure 3:
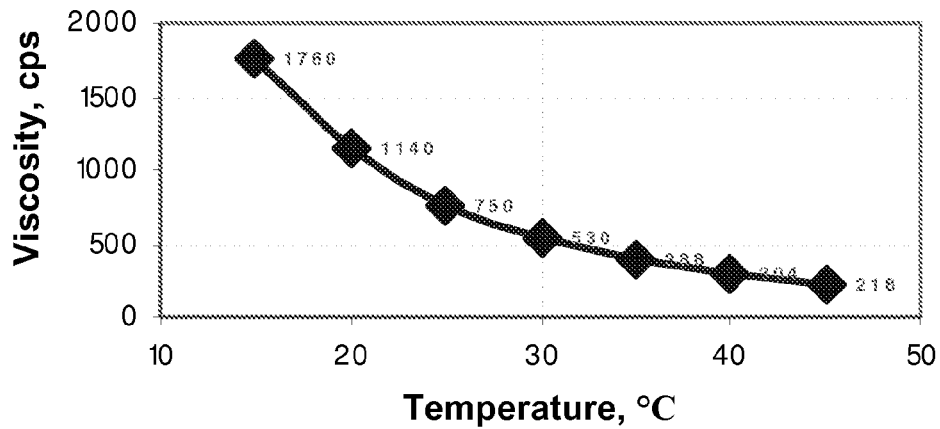
FIG. 3 illustrates a graph of viscosity versus temperature for the control/baseline polyol.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to the figures, FIG. 1 shows an initial and relatively rigid and crosslinked polyurethane foam bun 100 which may be manufactured from polyurethane (reactive) precursors such as one or more polyols and one or more isocyanates. Typically, the polyol may preferably have an OH concentration, measured by the OH value, of between 350 to 450 mg KOH/g. The isocyanate may have a NCO concentration, measured by weight percent NCO, of between 30.0 NCO to 35.0 NCO.

Polyurethane foam bun 100 may be preferably made using polyol and isocyanate available from Bayer Corporation, which may be marketed as a Baynat® foam system. Even more preferably, the polyol may be Bayer Baynat 3002B (polyether polyol) and the isocyanate may be Bayer Baynat 3002A (polymeric diphenylmethane diisocyanate (MDI) blend) which are components of the Baynat 3002 foam system. Baynat® is marketed as a specialized rigid foam which is produced either as a box pour or as slab foam or in panels (on continuous laminators). It is used predominantly in combination with fibrous facings and decorative materials for the manufacturing of sandwich headliners for automotive applications.

Polyurethane foam bun 100 may have a density in a range of and all increments between 25 kg/m$^3$ to 40 kg/m$^3$. Foam bun 100 may also comprise an open and/or closed cell foam.

In order to better square polyurethane bun 100 for production of subsequent products, polyurethane bun 100 may be sliced or otherwise cut along lines 110, resulting in the production of polyurethane foam byproduct 120 in the form of trim waste. Also, slicing or otherwise cutting polyurethane bun 100 along lines 110 may also remove a skin from the outer surfaces of polyurethane bun 100.

As shown in FIG. 2, polyurethane foam bun 100 may then be sliced along lines 130 to provide a plurality of similarly sized skived polyurethane foam sheets 140. The polyurethane foam sheets 140 may then be used in the manufacture of other products. For example, the polyurethane foam sheets 140 may be used in the manufacture of automotive trim products, such as automotive headliners.

In order to recycle polyurethane foam byproduct 120, polyurethane foam byproduct 120 may be first preferably be shredded into 1 inch cubes or smaller particles. Polyurethane foam byproduct 120 may then be subjected to a chemical recycling process to produce a recycled polyol. Even more particularly polyurethane foam byproduct 120 may be subjected to a chemolysis reaction to produce a chemolysis polyol product, and more particularly a glycolysis polyol product, such as taught by U.S. Pat. No. 6,750,260 to Sendijarevic entitled "Process For Chemical Recycling Of Polyurethane-Containing Scrap", which is hereby incorporated by reference in its entirety for all purposes.

The chemolysis, and more particularly glycolysis, may be understood essentially as an equilibration of the urethane, urea and isocyanurate bonds of the polyurethane material with glycols, such as propylene glycol, diethylene glycol and dipropylene glycol, in the presence of catalyst, such as potassium acetate and tin carboxylates, to form a liquid polyol product. The process may be conducted at temperatures between 179° C. to 219° C. at atmospheric pressure for a time of between 2 to 6 hours to reach equilibrium. The glycolysis product, which may subsequently be referred to as a recycled polyol, may be understood to contain active hydroxyls (—OH) from the glycols and the liberated polyols, as well as oligoineric amines and aromatic diamines, such as toluene diamines (TDA) and methylene dianiline (MDA). The recycled polyol may have an aromatic diamine content generally less than or equal to 1.0% by weight and in the range of 0.03% to 1.0% by weight. The recycled polyol may also have an average equivalent (EW$_{ave}$) weight between 100-500. In addition, the weight ratio of polyurethane to material to added glycol is between 1:1 to 14:1.

The recycled polyol, an example of which is designated herein as IAC-410S, may preferably have an OH concentration, measured by the OH value, of about 385 mg KOH/g. The recycled polyol preferably contains 50-70% by weight glycolysis product and 20-40% by weight dipropylene glycol. A particularly preferred recycled polyol may contain 60% by weight glycolysis product and 30% by weight dipropylene glycol, with a water content of less than or equal to 2.0% by weight. The recycled IAC-410S polyol typically has a relatively high reactivity thereby making it relatively difficult to control when reacted with isocyanates to generate polyurethane foam or a polyurethane product. Hence, by addressing this issue herein, the recycled IAC-410S polyol may now be more effectively is used as a partial and/or full replacement of virgin polyol components.

When recycled IAC-410S polyol from the chemolysis reaction is added to the virgin Bayer 3002B polyol and mixed with the 3002A isocyanate without further additives in a cup mix, the resulting polyurethane foam may exhibit an increase in density, due to a decrease in bun height, as illustrated below:

| Formulation | Bun Height | Percent Change |
|---|---|---|
| Control: Bayer 3002A/3002B | 10⅞" | |
| 1.65 iso/1.0 polyol wt ratio, 117 index | | |
| 95 PPH 3002B/5 PBW IAC-410S polyol | 10⅛" | −6.9% |
| 90 PPH 3002B/10 PBW IAC-410S polyol | 9⅞" | −9.2% |
| 85 PPH 3002B/15 PBW IAC-410S polyol | 9⅝" | −11.6% |
| 80 PPH 3002B/20 PBW IAC-410S polyol | 8⅞" | −18.4% |

PBW = parts by weight

Index in the above table may be understood as the isocyanate index, which may be understood as the excess of isocyanate over the theoretical amount for (1:1) reaction with all active H expressed in percentage terms (i.e. 1:1=100). Thus, isocyanate index=100×(actual amount of NCO used)/(theoretical amount of NCO required). For water-blown foams, one molecule of water can consume two equivalents of isocyanate (one to generate carbon dioxide and one to react with the amine produced).

From the foregoing data, it may be seen that when the recycled IAC-410S polyol is added to the virgin Bayer 3002B polyol and mixed with the 3002A isocyanate without further additives, there is a substantial decrease in bun height which may be understood to translate to a density increase and weight disadvantage from the polyurethane foam versus the control. As a result, fewer polyurethane foam slices may be obtained from polyurethane foam bun 100.

Thus, even though the recycled IAC-410S polyol may be useful to recycle some products/materials, further modification is advantageous if such is to be useful for recycling of relatively highly cross linked polyurethane foam, such as used for automotive headliners.

Upon further examination, and as alluded to above, in addition to bun height loss, the recycled IAC-410S polyol may also be found to exhibit an adverse viscosity and reaction profile as compared to the control/baseline (i.e. virgin Bayer 3002B polyol). With regards to viscosity, referring now to FIG. 3, there is shown a graph of viscosity (Brookfield) versus temperature for Bayer 3002B polyol. As shown, the viscosity goes from a high of 1760 cps (centipoise) at 15° C. to 218 cps at 45° C.

Figure 4:
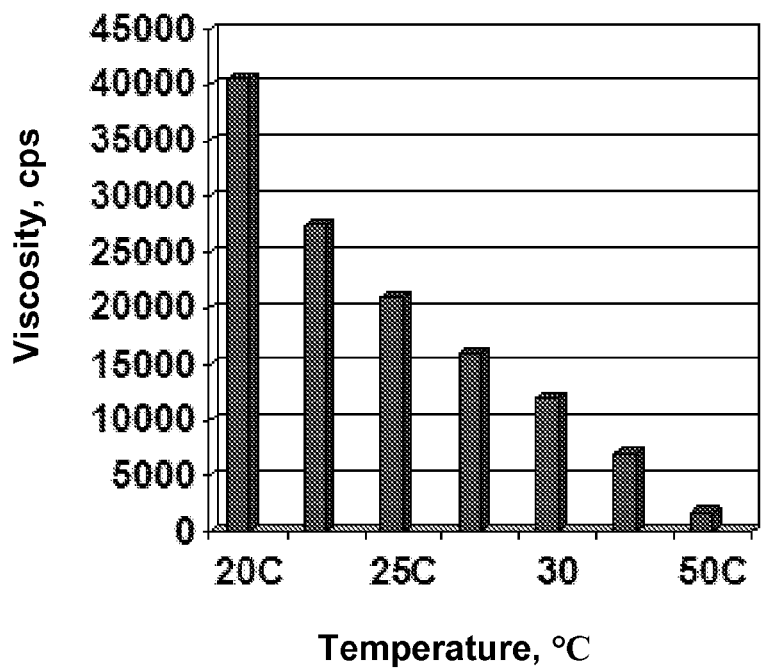
FIG. 4 illustrates a graph of viscosity versus temperature for the recycled polyol.

Now, referring to FIG. 4, there is a graph of viscosity (Brookfield) versus temperature for the recycled IAC-410S polyol. As shown, the viscosity varies from a high of about 40,000 cps (centipoise) at 20° C. to about 2,000 cps at 50° C. Thus, throughout the temperature range of 20° C. to 45° C., the viscosity of recycled IAC-410S polyol is generally an order of magnitude greater than the viscosity of Bayer 3002B polyol.

Additional data in Table I below provides further comparison between the control/baseline and polyurethane foam formulations which incorporate use of the recycled IAC-410S polyol. With respect to BAYNAT 3002B Polyol, IAC-410S Polyol, 3002 Iso and water, the numbers below are parts per hundred weight polyol:

TABLE I

| Formulation | Control | | |
|---|---|---|---|
| Baynat 3002B Polyol | 100 | 90 | 80 |
| IAC-410S Polyol | 0 | 10 | 20 |
| Deionized water | 4.08 | 4.08 | 4.08 |
| Baynat 3002A Isocyanate | 164.5 | 164.3 | 166.2 |
| Index | 117 | 117 | 117 |
| Performance | | | |
| Viscosity, Polyol (cps) @ 20° C. | 1140 | 4006 | 7918 |
| Equivalent Weight, Polyol | 152.861 | 152.146 | 151.422 |
| OH Concentration, Polyol | 367 | 333.8 | 370.6 |
| Reactivity Profile (sec) | | | |
| Mixing time | 25 | 25 | 25 |
| Cream time | 45 | 48 | 45 |
| Gel time | 220 | 210 | 190 |
| Rise time | 345 | 300 | 300 |
| Tack Free time | 600> | 600> | 600> |
| Mechanical Properties | | | |
| Free Rise Density (kg/m$^3$) | 37 | 36 | 36 |
| Free Rise Density- Top (kg/m$^3$) | 37 | 36 | 36 |
| Free Rise Density- Bottom (kg/m$^3$) | 41 | 40 | 42 |
| Tensile Strength (psi) | 76 +/− 8 | 82 +/− 1 | 76 +/− 1 |
| Elongation at break (%) | 26 +/− 3 | 35 +/− 1 | 25 +/− 1 |
| Compressive Stress at yield (psi) | 29 +/− 1 | 32 +/− 1 | 31 +/− 1 |

From the data in Table I it may be seen that when the recycled IAC-410S polyol is added to the polyurethane foam composition, the reaction profile is influenced with the reactivity profile decreasing in time as shown by a decrease in gel time and rise time. It may also be seen that the viscosity increases to 4006 and 7918 cps upon addition of 10 or 20 parts per hundred weights of the IAC-410S polyol.

In light of the above, there was observed a need to modify the control/baseline polyurethane formulation to make improved use of the recycled IAC-410S polyol. More particularly, the polyurethane formulation with the recycled IAC-410S polyol may now be particularly modified herein to achieve one or more of the following: (1) polyol reduced viscosity; (2) reduced the reaction profile (i.e. increasing reaction time particularly gel and rise time) in an ensuing polymerization reaction; and (3) reduced aromatic diamine concentration within the recycled polyol. These three modifications either alone or in combination may then further improve the recovered polyol performance in an ensuing polyurethane polymerization to provide, e.g., additional polyurethane foam at desired densities. Furthermore, these modifications may now all be introduced while also maintaining the acoustic and other physical properties of the end product.

Table II below provides a comparison of various polyurethane foam formulations which all incorporate use of the recycled IAC-410S polyol in varying amounts, along with various additives selected in light of the foregoing considerations.

TABLE II

| | Polyurethane Foam Formulations | | | | |
|---|---|---|---|---|---|
| Component | PBW | PBW | PBW | PBW | PBW |
| Baynat 3002B Polyol | 95.00 | 90.00 | 85.00 | 80.00 | 75.00 |
| IAC-410S Polyol | 5.00 | 10.00 | 15.00 | 20.00 | 25.00 |
| SPI-29 (Flexible Modifier) | 13.00 | 13.00 | 13.00 | 13.00 | 13.00 |
| DBE WS (Viscosity Reducer) | 2.00 | 3.00 | 4.00 | 5.00 | 6.00 |
| SPI-2663 (Concentrated Cell Opener) | 1.00 | 1.00 | 1.00 | 1.00 | 1.00 |
| SPI-369R (Catalyst) | 0.25 | 0.25 | 0.25 | 0.25 | 0.25 |
| Silicone surfactant package | 5.50 | 5.50 | 5.50 | 5.50 | 5.50 |
| DI-water (25 MegOhm deionized) | 4.08 | 4.08 | 4.08 | 4.08 | 4.08 |
| Baynat 3002A Isocyanate | 115.20 | 118.225 | 121.148 | 124.10 | 127.05 |
| Index | 117 | 117 | 117 | 117 | 117 |
| Performance | | | | | |
| Viscosity, Polyol (cps) @ 20° C. | 1140 | 1150 | 1200 | 1240 | 1210 |
| Reaction Profile (sec) | | | | | |
| Mixing time | 25 | 25 | 25 | 25 | 25 |
| Cream time | 45 | 42 | 47 | 43 | 41 |
| Gel time | 220 | 250 | 251 | 245 | 238 |
| Rise time | 335 | 380 | 390 | 370 | 375 |
| Tack free time | >7:00 | >7:00 | >7:00 | >7:00 | >7:00 |
| Mechanical Properties | | | | | | 
| Free Rise Density (kg/m$^3$) | 32 | 32 | 33 | 32 | 33 |

As shown in Table II, a viscosity reducer was identified, preferably a dibasic ester which may be added to the polyurethane formulation with the recycled IAC-410S polyol, in order to reduce the viscosity of the polyol blend. The dibasic ester (DBE) may be particularly provided from INVISTA. The dibasic ester(s) may be refined dimethyl esters of adipic, glutaric, and succinic acids. The dibasic ester(s) may be provided under the designation DBE® esters, which may be further distilled to produce six DBE® fractions for specialty applications: DBE®-2, DBE®-3, DBE®-4, DBE®-5, DBE®-6, DBE®-9, and DBE®-WS. DBE® esters are generally clear, colorless liquids having a mild, fruity odor. They are readily soluble in alcohols, ketones, ethers, and many hydrocarbons, but are only slightly soluble in water and higher paraffin's.

The DBE viscosity reducers herein themselves illustrate the following viscosity characteristics:

| | Viscosity Reducer: | | | | | | | |
|---|---|---|---|---|---|---|---|---|
| | DBE | DBE-2 | DBE-3 | DBE-4 | DBE-5 | DBE-6 | DBE-9 | DBE-WS |
| Viscosity cps @ 20° C. | 3.0 | 3.1 | 3.1 | 3.1 | 3.1 | 3.1 | 3.1 | 3.0 |

Accordingly, the DBE herein may have a viscosity in the range of 1.0 to 5.0 cps at 20° C. The viscosity reduction herein is preferably such that the viscosity of the recovered polyol is itself reduced down to a range of about 1,100 to 1,300 cps at 20° C., which is similar to the Baynat 3002B Polyol viscosity of 1,140 cps at 20° C. Thus, the use of the viscosity reducer may now effectively offset the viscosity increase of the polyol blend associated with use of the recycled polyol from chemolysis procedures.

As also shown in Table II, a polymerization catalyst may now preferably be used to decrease the reactivity profile (i.e. provide longer gel and rise time) of the polyurethane formulation when utilizing the recycled IAC-410S polyol, which may offset the increase in reactivity profile (i.e. decreased gel and rise time) associated with use of the recycled polyol. A suitable catalyst for this purpose is SPI-369R provided from Specialty Products International (Macungie, Pa.). Accordingly, a catalyst may be provided herein at a level of 0.1 to 1.0 parts by weight, when utilizing recycled polyol, which catalyst provides one or more of the following: (1) a gel time of 220 seconds or longer; and/or (2) a rise time of 345 seconds or longer.

Also, as shown in Table II, a flexible modifier (polyol) may now preferably be used to allow cell windows to open and improve elongation. Such flexible modifier may be present at a level of 5-20 parts by weight in a given foam formulation that employs the recovered polyols herein. SPI-29, a flexible modifier, may be particularly provided from Specialty Products International (Macungie, Pa.). A typical glycerine based trifunctional polyether polyol with an equivalent weight of 1939 and a viscosity of 1100 cps at 25° C.

Also, as shown in Table II, a cell opener may now preferably be used to improve cell window drainage. SPI-2663 may be particularly provided from Specialty Products International (Macungie, Pa.). SPI-2663 is a concentrated cell opener that contains 50% water so that it stays in suspension. The function of this material is to allow the cell walls that form during the reaction process to rupture and drain. The use levels can be from 0.05 to 2.0 parts depending on the degree drainage needed.

Also as shown in Table II, a surfactant package may be used to aid in cell opening and stability so that the foam does not collapse during the cell opening process. The surfactant package may include one or more of SPI-2630, SPI-2633 and SPI-2638, all which may be particularly provided from Specialty Products International (Macungie, Pa.).

Also, as shown in Table II, 25 MegOhm deionized water is preferably used as the blowing agent. The deionized water may be particularly provided from Siemans under the designation 25 MegOhm Ultra Pure Water.

As noted above, when now used in a rigid polyurethane system that has the foregoing additives, use of the recycled IAC-410S polyol with modification of viscosity and reaction profiles as described allows one to better achieve the desired result in acoustics for a recycled polyurethane foam for headliner construction. Such advantages may also now be preferably augmented by introducing within the recycled formulation, that makes use of the recovered polyol, in the presence of a viscosity reducer and catalyst, one or more of the following:

(1) a flexible modifier with hydroxyl content of 25 to 32; (2) cell opening surfactants; (3) a flexible cell stabilizer (4) concentrated cell openers; and (6) deionized water (25 MegOhm water).

An exemplary polyurethane formulation provided in light of the foregoing is as follows:

| Formulation IAC-X4-29-2 | PBW |
|---|---|
| Baynat 3002B Polyol | 67.00 |
| IAC-410S Polyol (recycled) | 20.00 |
| SPI-29 (Flexible Modifier) | 13.00 |
| Dibasic Ester (DBE) (viscosity reducer) | 4.00 |
| SPI-2663 (Concentrated Cell Opener) | 0.60 |
| SPI-369R (Catalyst) | 0.31 |
| Silicone surfactant package | — |
| SPI-2630 | 1.50 |
| SPI-2633 | 2.00 |
| SPI-2638 | 2.00 |
| DI-water (25 MegOhm deionized water) | 1.390 |
| Sub-total | 111.8 |
| Water (total) | 4.08 |
| Baynat 3002A Isocyanate | 152.2 |
| Index | 117 |
| Performance | |
| Viscosity, polyol (cps) @ 22° C. | 1,300 |
| Reaction Profile (sec) | |
| Mixing time | 25 |
| Cream time | 47 |
| Gel time | 4:09 |
| Rise time | 5:35 |
| Tack free time | >6:00 |
| Mechanical Properties | |
| Free Rise Density (kg/m$^3$) | 31.6 |

As may now be appreciated, the formulations herein may contain 65-95 parts by weight of a virgin polyol which has a viscosity range of 1760 cps at 15° C. to 218 cps at 45° C. To such polyol one may then add 5.0-25 parts by weight of a glycolysis polyol, which polyol has a viscosity range of 40,000 cps at 20° C. to 2000 cps at 50° C. and an average equivalent weight of 100-500. One may then add to such mixture of virgin polyol and glycolysis polyol a DBE viscosity reducer which level of DBE may be at 1-10 parts by weight, more preferably 2.0 to 6.0 parts by weight.

While not listed in the foregoing IAC-X4-29-2 formulation, the polyurethane foam formulation may also include an additional backend cure catalyst. A backend cure catalyst may be required if it is found that foam cure becomes problematic during normal production or during cold ambient conditions. This type of catalyst improves cure at the end of the reactive cycle and allows improved demold characteristics. The products that can be used as a backend cure catalyst include Dabco 33-LV (a solution of 33% tertiary amine (Triethylene diamine) and 67% dipropylene glycol) at 0.2 TO 0.50 PBW (Air Products and Chemicals, Inc.); Toyocat DM-70 (gelling amine catalyst) at 0.4 TO 1.00 PBW (Tosoh USA, Inc.); Toyocat DBU (1,8 diaza bicyclo) at 0.5 to 1.50 PBW; and/or Toyocat DMEA (N,N' diethylethanolamine) at 0.5 to 1.00 PBW.

Also while not listed in the foregoing IAC-X4-29-2 formulation, the polyurethane foam formulation may also include an ultraviolet brightener. A UV brightener is invisible in daylight and fluorescent blue or yellow under a black light. Normal color is milky white. This material is added to the polyol at concentration of 1 part brightener or less and 10 parts water as needed. This product is only needed if customer product identification is required.

The foregoing IAC-X4-29-2 polyurethane formulation exhibits a viscosity of about 1,300 cps at 22° C. At the same temperature, the control Bayer 3002B polyol exhibits a viscosity of about 1,100 cps. Thus the IAC-X4-29-2 has a viscosity of only about 200 cps more than the control at 22° C., which has been found to be within acceptable processing limits.

The effect on reactivity related to catalyst type and level and material temperature is very problematic at times as ambient temperatures increase and decrease during production hours. The SPI-369R helps improve some of the variations with the delay in reactivity and the increased blowing after the delay has reached its equilibrium. A too slow of a reaction will build density at the bottom of the bun and it will not be usable for headliner production. If the reaction is to fast the density will decrease and it will result in sheet weights being to low in density and no strength also making it not usable for production.

It should be noted that the air flow with the standard control herein (no recovered polyol) was normally 2.5 pounds per cubic foot per minute per square foot of test sample as recorded by a Frazier flow meter utilizing a Frazier 2000 Differential pressure air permeability tester. More specifically, the foam sample is a 4" square at 6.0 mm or 8.0 mm thickness, clamped over a 2.75" orifice suction hole. The inclined oil manometer needs to be at 5" of water pressure in order to register the pressure drop of the vertical oil manometer. The reading of the vertical oil manometer is the pressure drop across 1 of 9 different orifices from 1.0 mm to 16.0 mm. This result is recorded for the air permeability of the sample tested.

Air flow on new IAC-410-S showed the same air flow as the control at 2.5, 3.0, 2.9, and 2.5 pounds per cubic foot per minute per square foot of sample, based on a sample size of 13 for each recorded number. Each number represents an increase from 5, 10, 15 and 20 parts of IAC-410-S. Samples tested with the same configuration with an Acoustic formulation and scrap IAC-410-S show improved air flow numbers from 8 Pounds per cubic foot to 15 pounds per cubic foot demonstrating that the cell windows are more open and will give an improved sound reduction.

The invention claimed is:

1. A method of forming a polyurethane foam utilizing closed-loop recycling of polyurethane foam scrap comprising:
    forming a recycled polyol by subjecting polyurethane foam scrap to glycolysis;
    adding at least a portion of said recycled polyol to a virgin polyol to produce a polyol blend, wherein said polyol blend comprises 65-95 parts by weight of a virgin polyol, 5-25 parts by weight of said recycled polyol, and a viscosity reducer, wherein said polyol blend has a viscosity in a range of 1,100 to 1,300 cps at 20° C.;
    forming a polyurethane foam from said polyol blend, wherein said polyurethane foam is characterized by a gel time of 220 seconds or longer and/or a rise time of 345 seconds or longer; and
    producing said polyurethane foam scrap from said polyurethane foam, wherein said polyurethane foam scrap is used for forming the recycled polyol;
    wherein said polyurethane foam has a density in a range of 25 kg/m$^3$ to 40 kg/m$^3$;
    wherein said polyurethane foam is produced in the form of a polyurethane bun;
    wherein said polyurethane foam scrap is produced as polyurethane foam trim waste from the polyurethane foam bun; and
    wherein said polyurethane foam trim waste results from cutting the polyurethane foam bun into polyurethane foam sheets.

2. The method of claim 1 wherein:
said polyurethane foam trim waste is shredded into 1 inch cubes or smaller particles prior to being subjected to glycolysis.

3. The method of claim 1 wherein:
said polyurethane foam sheets are formed into an automotive trim product.

4. The method of claim 3 wherein:
said automotive trim product is a headliner.

5. The method of claim 1 wherein:
said recycled polyol has an average equivalent weight in the range of 100-500.

6. The method of claim 1 wherein:
said recycled polyol has a viscosity range of 40,000 cps at 20° C. to 2,000 cps at 50° C.

7. The method of claim 1 wherein:
said virgin polyol has a viscosity range of 1,760 cps at 15° C. to 218 cps at 45° C.

8. The method of claim 1 wherein:
said viscosity reducer comprises a dibasic ester.

9. The method of claim 8 wherein:
said dibasic ester is present at a level of 1-10 parts by weight of the polyol blend.

10. The method of claim 8 wherein:
said dibasic ester has a viscosity in the range of 1.0 to 5.0 cps at 20° C.

11. The method of claim 8 wherein:
said dibasic ester comprises a dimethyl ester of adipic, glutaric and/or succinic acid.

12. The method of claim 1 wherein:
a polymerization catalyst is added to said polyol blend.

13. The method of claim 12 wherein:
said catalyst is present at a level of 0.1 to 1.0 part by weight of the polyol blend.

14. The method of claim 12 wherein:
the polyol blend has an increased reactivity profile as compared to a reactivity profile of the virgin polyol; and
the polymerization catalyst is added to the polyol blend to decrease the reactivity profile of the polyol blend.

* * * * *